(12) United States Patent
Yin et al.

(10) Patent No.: US 12,630,440 B2
(45) Date of Patent: May 19, 2026

(54) TITANIUM DIOXIDE COLORING PARTICLES, METHOD FOR PRODUCING THE SAME, AND TITANIUM DIOXIDE PARTICLE MIXTURE

(71) Applicant: TOHOKU UNIVERSITY, Sendai (JP)

(72) Inventors: Shu Yin, Sendai (JP); Jingdi Cao, Sendai (JP); Yusuke Asakura, Sendai (JP); Takuya Hasegawa, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 527 days.

(21) Appl. No.: 18/015,411

(22) PCT Filed: Jul. 30, 2021

(86) PCT No.: PCT/JP2021/028401
§ 371 (c)(1),
(2) Date: Jan. 10, 2023

(87) PCT Pub. No.: WO2022/025270
PCT Pub. Date: Feb. 3, 2022

(65) Prior Publication Data
US 2023/0286823 A1 Sep. 14, 2023

(30) Foreign Application Priority Data

Jul. 31, 2020 (JP) ................................. 2020-130912

(51) Int. Cl.
*C01G 23/07* (2006.01)
*C01G 23/08* (2006.01)
(52) U.S. Cl.
CPC .............. *C01G 23/07* (2013.01); *C01G 23/08* (2013.01); *C01P 2002/30* (2013.01); *C01P 2002/52* (2013.01)

(58) Field of Classification Search
None
See application file for complete search history.

(56) References Cited

FOREIGN PATENT DOCUMENTS

| CN | 102343260 A | * | 2/2012 | |
| KR | 101905419 B1 | * | 10/2018 | ........... C01G 23/047 |

OTHER PUBLICATIONS

Machine Translation for CN-102343260-A (Year: 2012).*
(Continued)

*Primary Examiner* — Michael Forrest
(74) *Attorney, Agent, or Firm* — Sughrue Mion, PLLC

(57) ABSTRACT

An object of the invention is to provide titanium dioxide coloring particles capable of developing colors other than red and yellow while maintaining non-toxicity of titanium dioxide and a titanium dioxide particle mixture containing the titanium dioxide coloring particles, and to provide a method capable of producing the titanium dioxide coloring particles exhibiting the excellent properties by a simple process with a small environmental load. The invention relates to titanium dioxide coloring particles having a brookite type or rutile type crystal structure and co-doped with at least nitrogen and boron, a titanium dioxide particle mixture containing the titanium dioxide coloring particles, and a method for producing the titanium dioxide coloring particles in which a hydrothermal reaction of titanium diboride is caused in presence of an acid or urea, and then a nitriding treatment is performed in an ammonia gas atmosphere or by mixing with urea or carbon nitride.

5 Claims, 3 Drawing Sheets

(56) References Cited

OTHER PUBLICATIONS

Nada et al ("Highly textured boron/nitrogen co-doped TiO2 with honeycomb structure showing enhanced visible-light photoelectrocatalytic activity", Applied Surface Science, vol. 505, (2020), 144419). (Year: 2020).*

Gombac et al ("TiO2 nanopowders doped with boron and nitrogen for photocatalytic applications", Chemical Physics, vol. 339, Issues 1-3, (2007), pp. 111-123). (Year: 2007).*

Machine Translation for KR-101905419 (Year: 2018).*

Communication dated Jan. 16, 2024 issued by the Japanese Intellectual Property Office in corresponding Japanese Application No. 2020-130912.

Jingdi Cao et al., "Synthesis and Photochemical Performance Evaluation of Colorful Three Phases $TiO_2$", The Ceramic Society of Japan, Mar. 18, 2020-Mar. 20, 2020, p. 2.

Xiaosong Zhou et al., "Effect of nitrogen-doping temperature on the structure and photocatalytic activity of the B, N-doped $TiO_2$", Journal of Solid State Chemistry, Vo. 184, 2011, pp. 134-140.

J. Georgieva et al., "A simple preparation method and characterization of B and N co-doped $TiO_2$ nanotube arrays with enhanced photoelectrochemical performance", Applied Surface Science, vol. 413, 2017, pp. 284-291.

Jingzhong Zhao et al., "A Novel Method to Prepare B/N Codoped Anatase $TiO_2$", The Journal of Physical Chemistry, vol. 119, 2018, 7732-7737.

Jingdi Cao et al., "B/N Anions Co-doped Multi-crystalline $TiO_2$ and its Photocatalytic Activity", The 13th Pacific Rim Conference of Ceramic Sciences, Oct. 27-Nov. 1, 2019.

Gang Liu et al., "A red anatase $TiO_2$ photo catalyst for solar energy conversion", Energy & Environmental Science, 2012, vol. 5, pp. 9603-9610.

R. Asahi et al., "Visible-light Photocatalysis in Nitrogen-Doped Titanium Oxides", Science, vol. 293, Jul. 13, 2001, pp. 269-271.

* cited by examiner

[FIG. 1]
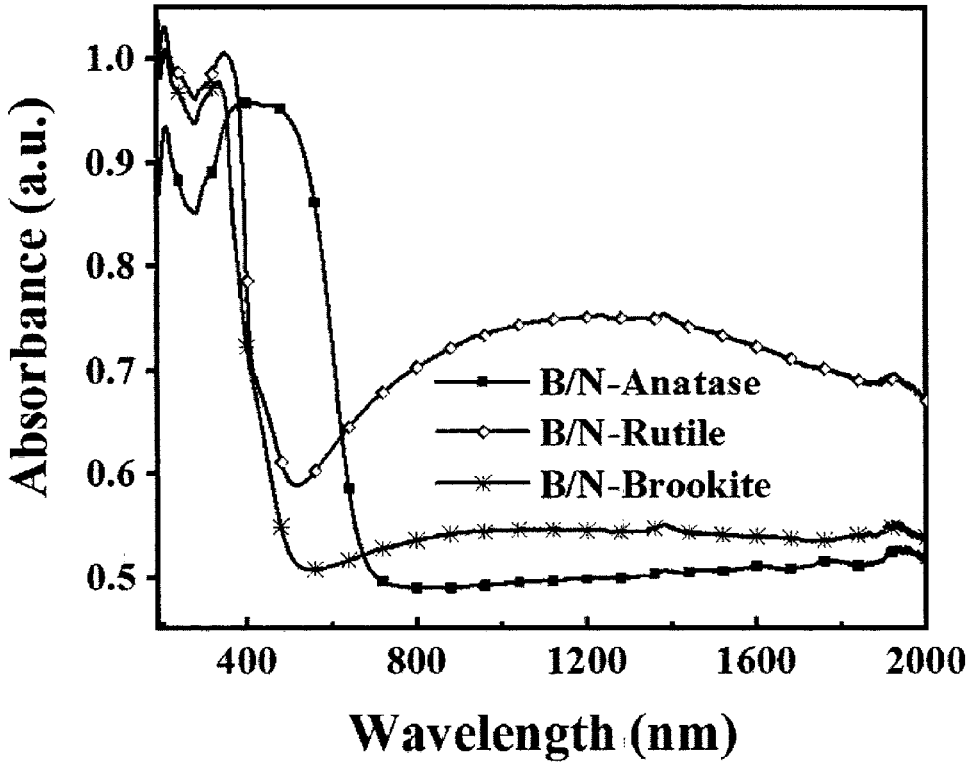
[FIG. 2]
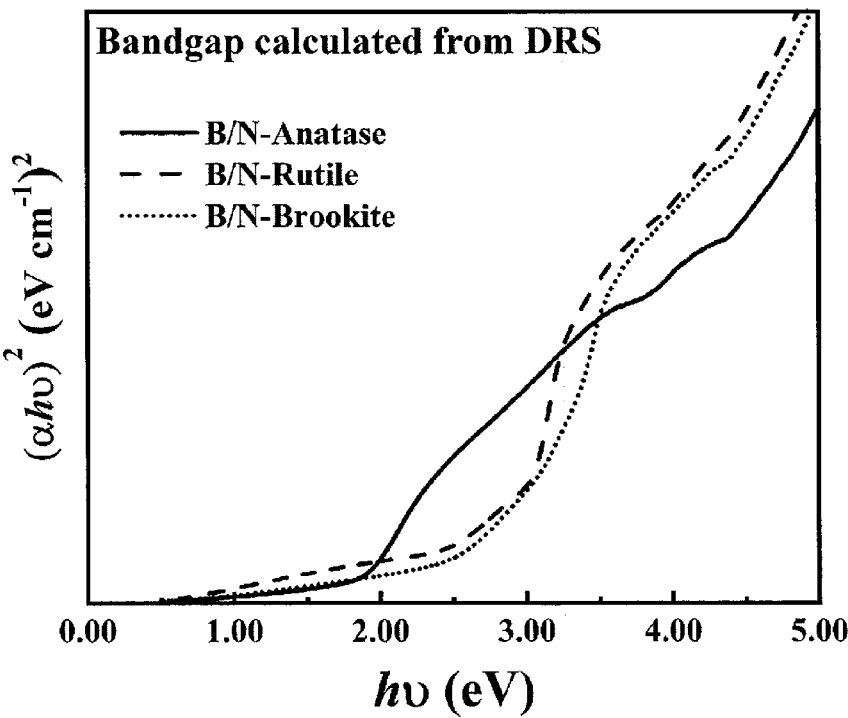

[FIG. 3]
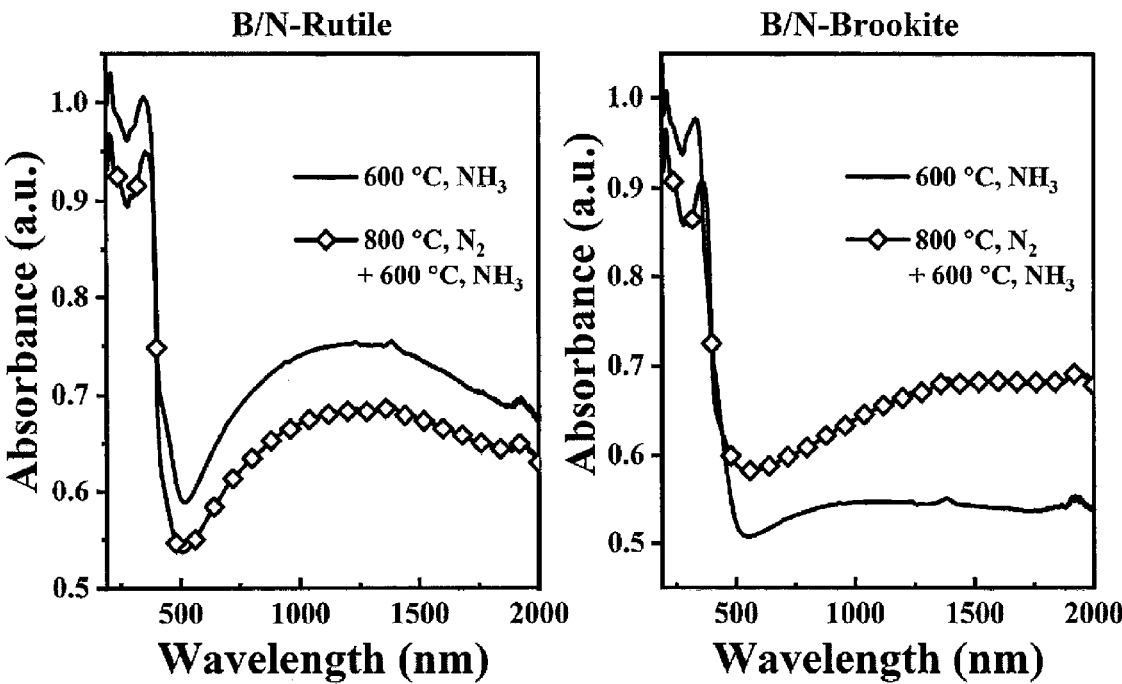
[FIG. 4]
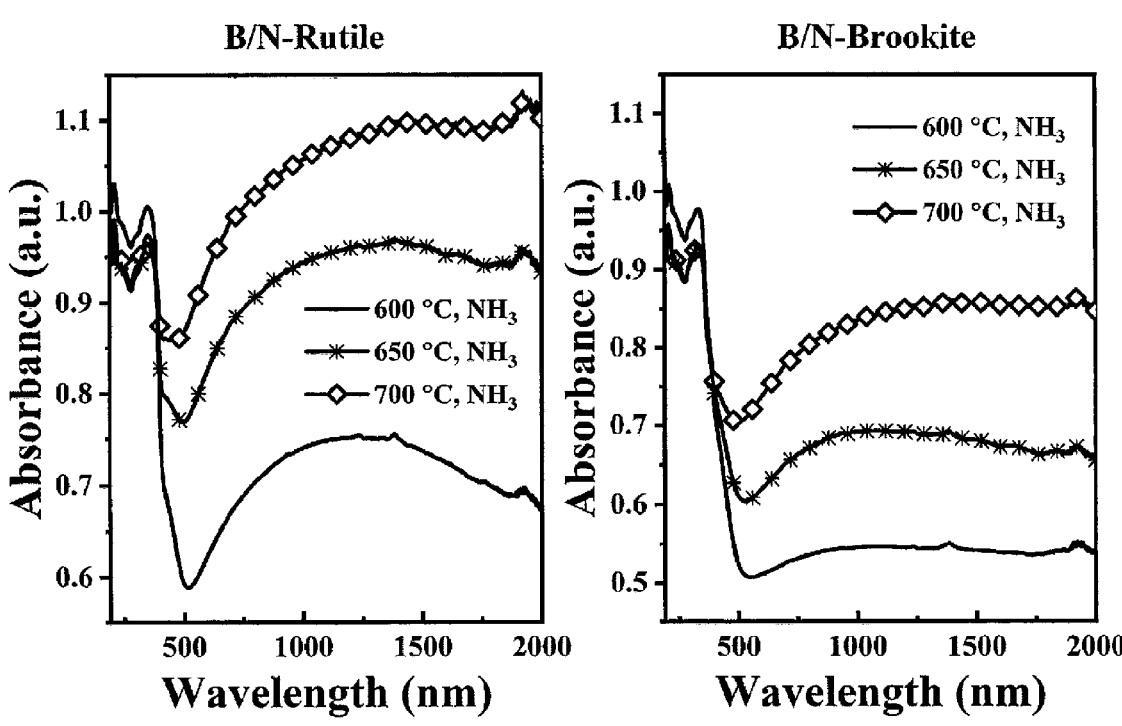

[FIG. 5]
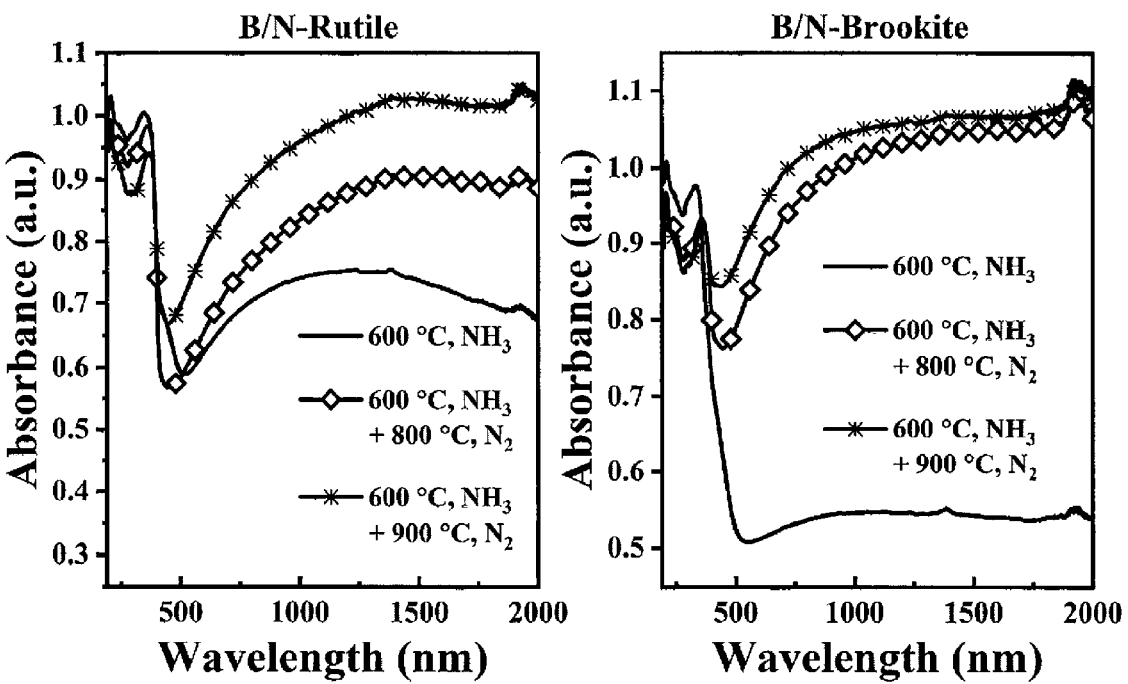

TITANIUM DIOXIDE COLORING PARTICLES, METHOD FOR PRODUCING THE SAME, AND TITANIUM DIOXIDE PARTICLE MIXTURE

This Application is a National Stage of International Application No. PCT/JP2021/028401 filed Jul. 30, 2021, claiming priority based on Japanese Patent Application No. 2020-130912 filed Jul. 31, 2020.

TECHNICAL FIELD

The present invention relates to titanium dioxide coloring particles, a method for producing the titanium dioxide coloring particles, and a titanium dioxide particle mixture.

BACKGROUND ART

Titanium dioxide has a high refractive index and excellent hiding power, and is chemically stable and non-toxic. Titanium dioxide having such excellent properties is widely used for inorganic pigments, photocatalysts, and the like. Titanium dioxide has a band gap (BG) of 3.0 eV or 3.2 eV, and is white. However, when titanium dioxide can develop colors other than white, applications as various novel functional materials such as pigments for paints, medical applications, pigments for cosmetics, and food additives are expected.

As a method for causing white titanium dioxide to develop various colors, for example, a method of doping titanium dioxide with transition metal ions (for example, iron ions, chromium ions, or cadmium ions) is known. For example, when the iron ions are doped, red titanium dioxide is obtained. However, titanium dioxide doped with the transition metal ions expresses biotoxicity derived from a transition metal, impairs excellent biocompatibility that is non-toxicity, and cannot be used for medical applications, cosmetic applications, food additives, etc., and thus the applications as a functional material are limited.

Therefore, titanium dioxide colored by doping anions other than the transition metal ions has been proposed. Examples thereof include yellow titanium dioxide obtained by doping titanium dioxide having an anatase type crystal phase (crystal structure) with nitrogen anions (NPL 1). Examples thereof further include a red titanium dioxide photocatalyst obtained by co-doping titanium dioxide having an anatase type crystal structure with nitrogen anions and boron anions (NPL 2).

CITATION LIST

Non-Patent Literature

NPL 1: R. Asahi, et al. Science, 2001, 293, p. 269-271
NPL 2: Liu G, et al. Energy Environ. Sci., 2012, 5, p. 9603-9610

SUMMARY OF INVENTION

Technical Problem

NPL 1 and NPL 2 state that titanium dioxide is caused to develop a yellow or red color, but do not describe or suggest development of colors other than yellow and red, and in order to use titanium dioxide as a novel functional material, it is required to develop not only red and yellow but also various colors.

An object of the invention is to solve the above problems and provide titanium dioxide coloring particles capable of developing colors other than red and yellow while maintaining non-toxicity of titanium dioxide and a titanium dioxide particle mixture containing the titanium dioxide coloring particles. Another object of the invention is to provide a method capable of producing the titanium dioxide coloring particles exhibiting the excellent properties by a simple process with a small environmental load.

Solution to Problem

As a result of studying color development of titanium dioxide, the present inventors have found that, when a brookite type or rutile type is employed as a crystal structure of titanium dioxide, both nitrogen ions and boron ions are co-doped, so that colors other than a color developed by titanium dioxide having an anatase type crystal structure can also be developed. In addition, the present inventors have found that by using titanium diboride as a starting material, performing a hydrothermal reaction using water as a solvent at a high temperature and a high-pressure in presence of an acid or urea, and then performing a nitriding treatment, titanium dioxide coloring particles having a brookite type or rutile type crystal lattice co-doped with both the nitrogen ions and boron ions can be produced by a simple process with a small environmental load.

Based on these findings, the present inventors have conducted further researches and completed the invention.

That is, the object of the invention was achieved by the following means.

<1> Titanium dioxide coloring particles that have a brookite type or rutile type crystal structure and are co-doped with at least nitrogen and boron.

<2> The titanium dioxide coloring particles according to <1>, which have a lattice defect.

<3> A titanium dioxide particle mixture containing at least one type of the titanium dioxide coloring particles according to the above <1> or <2>.

<4> A method for producing the titanium dioxide coloring particles according to the above <1> including: causing a hydrothermal reaction of titanium diboride in presence of an acid or urea, and then performing a nitriding treatment in an ammonia gas atmosphere or by mixing with urea or carbon nitride ($C_3N_4$).

<5> The production method according to <4>, which is a method for producing the titanium dioxide coloring particles according to the above <2>, in which a temporary calcination treatment is performed in an inert gas or a vacuum between the hydrothermal reaction and the nitriding treatment or after the nitriding treatment.

<6> The production method according to <4>, which is the method for producing the titanium dioxide coloring particles according to the above <2>, in which the temporary calcination treatment is performed simultaneously with the nitriding treatment.

In the invention, a form such as a fine powder falls within the "particles". Therefore, the "coloring particles" can also be referred to as a "coloring agent" or a "coloring material".

In the present specification, a numerical range expressed using "to" means a range including numerical values described before and after "to" as a lower limit value and an upper limit value.

Advantageous Effect

The invention can provide titanium dioxide coloring particles capable of developing colors other than red and yellow while maintaining non-toxicity of titanium dioxide and a titanium dioxide particle mixture containing the titanium dioxide coloring particles. In addition, the invention can provide a method capable of producing the titanium dioxide coloring particles exhibiting the excellent properties by a simple process with a small environmental load.

The above and other features and advantages of the invention will become more apparent from the following description with reference to the accompanying drawings as appropriate.

BRIEF DESCRIPTION OF DRAWINGS

FIG. 1 is a diagram showing diffuse reflection spectra of titanium dioxide coloring particles produced in Examples 1-1 and 1-2 and Reference Example 1-1.

FIG. 2 is a diagram showing Tauc Plot used for calculating a band gap based on the diffuse reflection spectra shown in FIG. 1.

FIG. 3 is a diagram showing diffuse reflection spectra of titanium dioxide coloring particles produced in Examples 2-1 and 2-2.

FIG. 4 is a diagram showing diffuse reflection spectra of titanium dioxide coloring particles produced in Examples 3-1 and 3-2.

FIG. 5 is a diagram showing diffuse reflection spectra of titanium dioxide coloring particles produced in Examples 4-1 and 4-2.

DESCRIPTION OF EMBODIMENTS

[Titanium Dioxide Coloring Particles]

Titanium dioxide coloring particles of the invention have a brookite type or rutile type crystal structure, and are co-doped with at least both nitrogen ions and boron ions as dopants. Preferably, the titanium dioxide coloring particles have a lattice defect. As will be described later, the titanium dioxide coloring particles can develop colors other than a color developed by titanium dioxide having an anatase type crystal structure.

Details of a reason for the above are not yet clear, but are considered as follows.

It is considered that when titanium dioxide is co-doped with nitrogen and boron, a hybrid orbital generated by both dopants (nitrogen and especially interstitial type B to be described later) is formed on a conduction band side. Therefore, a band gap between the hybrid orbital and a conduction band in the co-doped titanium dioxide is smaller than a band gap between a valence band and a conduction band of titanium dioxide. In addition, titanium dioxide has a band gap specific to a crystal structure. As a result, it is considered that the co-doped titanium dioxide can develop a specific color corresponding to a band gap reduced by co-doping from the band gap specific to the crystal structure, and can develop various colors (color development control) by changing the crystal structure and/or the band gap (changing an absorption spectrum). For example, when the band gap is reduced, the color to be developed tends to have a strong bluish or greenish tint.

As a result of further studying the color development of titanium dioxide, the present inventors have also found that, by introducing a lattice defect such as an oxygen defect or $Ti^{3+}$ into a crystal lattice of titanium dioxide, a color depth and the like can be adjusted, and a wide variety of colors can be developed. It is considered that, when a lattice defect is formed in the co-doped titanium dioxide, an absorption amount of visible light increases or decreases (absorption spectrum changes), a doping amount of nitrogen changes, and more visible light absorption occurs based on a correlation with a band structure of the co-doped titanium dioxide. Therefore, the color depth increases due to this lattice defect, and the color changes to purple or black. It is considered that, by adjusting the color depth due to the lattice defect in addition to the change in the above crystal structure and/or the band gap, titanium dioxide can develop various colors with a combination of both actions.

There are three known crystal structures of titanium dioxide, i.e., an anatase type (tetragonal), a rutile type (tetragonal), and a brookite type (orthorhombic), and the crystal structure of the titanium dioxide coloring particles of the invention is a brookite type or rutile type. Since a doping amount of the ions decreases when titanium dioxide undergoes a phase transition, it is usually difficult to produce titanium dioxide having a rutile type or brookite type crystal structure by phase transition, and direct formation of the rutile type or brookite type crystal structure without going through the anatase type crystal structure is important for controlling the doping amount of the ions and the color. The crystal structure of titanium dioxide can be identified by a known method such as a powder X-ray diffraction (XRD) method.

The crystal structures constituting titanium dioxide coloring particles of the invention may contain an anatase type as long as effects of the invention are not impaired, and a content (abundance) of an anatase phase quantified by the powder X-ray analysis (XRD) method may be, for example, 50% or less, or 30% or less.

The dopant contained in the titanium dioxide coloring particles of the invention may contain both nitrogen ions and boron ions, and may contain other ions. Examples of any dopant include ions of elements other than a transition metal element, such as ions of halogen elements, and ions of elements such as sulfur, fluorine, phosphorus, and carbon. Among them, the ions of the halogen elements are preferable, and ions of a chlorine element are more preferable from the viewpoint that various colors can be developed (excellent in a color developing property).

The dopant is usually doped as ions in a crystal lattice or between crystal lattices, and in the invention, the dopant may be doped not only as ions of single elements, but also as an ion group together with other elements, or as a neutral element, for example.

A doping amount of the dopant in the titanium dioxide coloring particles is not particularly limited and is appropriately determined. For example, a (total) doping amount of the boron ions can be set to 0.01 atom % to 10 atom %, and preferably 2 atom % to 5 atom %. A (total) doping amount of the nitrogen ions can be set to 0.01 atom % to 10 atom %, preferably 0.01 atom % to 3 atom %, and more preferably 0.01 atom % to 1.0 atom %. A (total) doping amount of the halogen ions can be set to 0.01 atom % to 10 atom %, and preferably 0.01 atom % to 3 atom %. Various colors can be developed by changing the doping amount of the dopant within each of the above ranges.

The doping amount can be measured by a measuring method in Examples to be described later.

The titanium dioxide coloring particles contain boron ions (referred to as interstitial type B) doped between the crystal lattices, and boron ions (referred to as substituted type B) doped by substituting oxygen ions in the crystal lattices. In the invention, the presence of the interstitial type B is considered to act on absorption of light having a wavelength of 400 nm to 600 nm for the obtained titanium dioxide, and participates in color development of colors. On the other hand, the presence of the substituted type B is considered to act on absorption of light having a wavelength of 900 nm to 1700 nm, and an influence on a color that can be visually recognized is small. Therefore, by changing a doping amount of the interstitial type B, colors other than the color developed by titanium dioxide having an anatase type crystal structure can be developed by changing the color to be developed. For example, when an abundance (doping amount) of the interstitial type B is increased, redness of the developed color tends to be strong.

The abundance of the interstitial type B is preferably 3.0 atom % or less, which is less than that of titanium dioxide having an anatase type crystal structure. A doping amount of an interstitial type B in the titanium dioxide coloring particles having a brookite type crystal structure is more preferably 1.0 atom % to 2.5 atom %, and a doping amount of an interstitial type B in the titanium dioxide coloring particles having a rutile type crystal structure is more preferably 1.0 atom % to 3.0 atom %. In the titanium dioxide coloring particles of the invention, a ratio of the doping amount of the interstitial type B to the doping amount of the substituted type B [doping amount of interstitial type B/doping amount of substituted type B] is not particularly limited, and is preferably, for example, 2 to 5.

On the other hand, the nitrogen ions or the like are doped between the crystal lattices and in the crystal lattices. Each doping amount is not particularly limited and may be appropriately set.

The ions may be doped by, for example, a hydrothermal reaction, which will be described later.

The titanium dioxide coloring particles of the invention do not contain ions of transition metal elements other than titanium, and maintain non-toxicity of titanium dioxide. In the invention, the expression "not contain ions of transition metal elements other than titanium" means that the transition metal elements other than titanium are not used for color development (control) of titanium dioxide, and are inevitably contained. For example, a content of the ions of the transition metal elements other than titanium (measured in the same manner as the doping amount of the dopant) can be 0.2 atom % or less in the titanium dioxide coloring particles.

It is preferable that the titanium dioxide coloring particles of the invention have a lattice defect from the viewpoint that the color depth (brightness) and the like can be adjusted and various colors can be developed. The lattice defect refers to disorder of an atomic arrangement in the crystal structure and includes a defect (for example, an oxygen defect) due to an atomic vacancy, and substitution of $Ti^{4+}$ with a titanium ion at a lower oxidation state ($Ti^{3+}$, $Ti^{2+}$, etc.) has a stronger influence on discoloration. The titanium dioxide coloring particles having the lattice defect can be referred to as oxygen defect titanium dioxide coloring particles or low order titanium dioxide coloring particles. An abundance of the lattice defect is not particularly limited, and from the viewpoint that the color depth and the like can be appropriately adjusted, when the low order titanium dioxide coloring particles are represented by a formula: $TiO_{(2-x)}$, x is preferably 0.01 to 1, and more preferably 0.01 to 0.3. The larger the abundance of the lattice defect is, the darker the color becomes, and for example, the color can be developed to deep purple, black, or the like. The abundance x of the lattice defect can be measured by a measuring method in Examples to be described later.

The lattice defect can be formed by, for example, a temporary calcination treatment to be described later.

The form of the titanium dioxide coloring particles of the invention is not particularly limited, and may be any of a cube shape, a granular shape, a spherical shape, a flat shape, a rod shape, an irregular shape, a fine particle shape, a fine powder shape, or the like. An average particle diameter of the titanium dioxide coloring particles is not particularly limited, and both a primary particle diameter and a secondary particle diameter may be in a range of, for example, 0.01 μm to 10 μm. When the titanium dioxide coloring particles are used as a pigment, the average particle diameter is preferably 0.05 μm to 5 μm. The average particle diameter can be measured by observing the particles with a scanning electron microscope (SEM) or a transmission electron microscope (TEM), measuring particle diameters of 20 particles freely selected, and calculating an average value thereof.

The titanium dioxide coloring particles of the invention develop various colors as described later. The color exhibited by the titanium dioxide coloring particles of the invention cannot be uniquely determined by adjusting the type of the crystal structure, the doping amount of each ion, the abundance of the lattice defect, and the like, and as will be described later, the color is a color corresponding to the band gap of the hybrid orbital formed by both ions and the abundance of the lattice defect.

[Titanium Dioxide Particle Mixture]

A titanium dioxide particle mixture of the invention is a mixture of two or more types of titanium dioxide particles containing at least one type of titanium dioxide coloring particles of the invention. The number of types of the mixed titanium dioxide particles is not particularly limited, and may be, for example, 2 to 5. Depending on the types of the mixed titanium dioxide particles, a color that cannot be developed by the titanium dioxide coloring particles of the invention alone can be exhibited.

The titanium dioxide particle mixture of the invention may be a mixture of two or more types of titanium dioxide coloring particles of the invention, or may be a mixture with known titanium dioxide particles (for example, white, red, or yellow titanium dioxide particles). Titanium dioxide particles to be mixed according to colors to be expressed can be appropriately selected, and a content thereof can be appropriately set. A method of developing a color by mixing the titanium dioxide particles is not particularly limited, titanium dioxide particles having a predetermined color may be appropriately mixed, and subtractive color mixing or the like can also be employed.

The titanium dioxide particle mixture of the invention can be produced by a known mixing method.

Since the titanium dioxide particle mixture contains the titanium dioxide coloring particles of the invention and is usually a mixture of titanium dioxide particles having different colors, any one of hue (tint), lightness (brightness), and chroma (vividness), which cannot be achieved by the titanium dioxide coloring particles of the invention alone, can be adjusted, and various colors can be developed by appropriately setting a combination of the titanium dioxide particles to be mixed, a mixing amount, and the like.

Since the titanium dioxide coloring particles and the titanium dioxide particle mixture of the invention exhibit various colors as described above, the titanium dioxide coloring particles and the titanium dioxide particle mixture can be used as various pigments of paints, cosmetics, or the like, photocatalysts, and can further be used as medical applications, food additives, or the like, taking advantage of non-toxicity. In particular, the titanium dioxide coloring particles having a brookite type crystal structure and the titanium dioxide particle mixture containing the titanium dioxide coloring particles exhibit a photocatalytic activity equivalent to or higher than that of titanium dioxide white particles for light having a wavelength of 290 nm to 400 nm, and can be suitably used as photocatalysts.

[Method for Producing Titanium Dioxide Coloring Particles]

A method for producing the titanium dioxide coloring particles of the invention is a method for synthesizing titanium dioxide particles co-doped with boron and nitrogen by causing a hydrothermal reaction (solvothermal reaction) of titanium diboride in presence of an acid or urea to synthesize titanium dioxide particles doped with boron, and then performing a nitriding treatment by placing the product in an ammonia gas atmosphere as a nitrogen source or by mixing the product with urea or carbon nitride ($C_3N_4$).

In the method for producing the titanium dioxide coloring particles of the invention (also referred to as the production method of the invention), synthesis of titanium dioxide particles having a specific crystal structure and doping of the boron ions into titanium dioxide can be performed at once by the hydrothermal reaction. Therefore, the synthesis can be easily performed while reducing an environmental load.

<Hydrothermal Reaction>

In the hydrothermal reaction, titanium diboride is used as a titanium source and a boron source.

The acid used in the hydrothermal reaction is not particularly limited, an organic acid or an inorganic acid can be used, and the inorganic acid is preferable. Examples of the inorganic acid include sulfuric acid, hydrogen chloride (hydrochloric acid), nitric acid, phosphoric acid, and the like. When the inorganic acid is used, a base, for example, an alkali metal salt of the inorganic acid to be used may also be used in combination. A usage amount of the acid may be an amount necessary for synthesizing titanium dioxide, and may be usually 1 mol to 15 mol, preferably 1 mol to 10 mol, and more preferably 2 mol to 3 mol, with respect to 1 mol of titanium diboride. A usage amount of the base used is not particularly limited and can be appropriately set, and for example, the usage amount may be 0.5 mol to 5 mol with respect to 1 mol of titanium boride.

In the production method of the invention, urea may be used in place of the acid. Urea is preferably used as an aqueous solution. A usage amount of urea may be an amount necessary for synthesizing titanium dioxide, and may be usually 0.5 mol to 15 mol, preferably 0.5 mol to 5 mol, and more preferably 2 mol to 3 mol, with respect to 1 mol of titanium diboride.

In the hydrothermal reaction, a base (metal salt) can be used. As the base, for example, an alkali metal salt of a carboxylic acid such as sodium lactate, an alkali metal salt or an alkaline earth metal salt of an inorganic acid such as sodium sulfate or sodium chloride can be used. A usage amount of the base is not particularly limited and may be appropriately set, and for example, the usage amount may be 0.5 mol to 5 mol with respect to 1 mol of titanium boride.

In the hydrothermal reaction, when titanium dioxide having a rutile type crystal structure is preferentially synthesized, it is preferable to cause a hydrothermal reaction of titanium diboride in the presence of an acid. By changing the type and the usage amount of the acid used in the hydrothermal reaction in the presence of an acid, the finally synthesized titanium dioxide coloring particles of the invention can develop various colors (color development control). For example, when the type of the acid is changed and HCl is used, the developed color tends to be darker. When $HNO_3$ is used, the brookite type is formed, and green tends to be strong as described later. In addition, when the usage amount of the acid is decreased, the developed color tends to become brighter, whereas when the usage amount thereof is increased, color saturation tends to decrease and the color tends to become darker. More specifically, when a concentration of hydrochloric acid is increased, $L^*$, $a^*$, and $b^*$ tend to decrease in the following Lab color space image, whereas when a concentration of $H_2SO_4$ is increased, $L^*$ tends to slightly decrease and $a^*$ and $b^*$ tend to increase in the following Lab color space image.

when the alkali metal salt of the inorganic acid or the like is used in combination or when hydrochloric acid is used without using sodium sulfate, $a^*$ is less than 0, and green is exhibited, and when sodium sulfate is added, $a^*$ becomes 0 or more and the redness is increased. At this time, when the concentration of hydrochloric acid is increased in the presence of sodium sulfate, $L^*$, $a^*$, and $b^*$ all tend to decrease in the following Lab color space image, and when a concentration of sodium sulfate is increased in the presence of hydrochloric acid, brightness represented by $L^*$ tends to decrease in the following Lab color space image. In addition, when the concentration of sodium chloride is increased in the presence of hydrochloric acid, $L^*$ and $b^*$ are both increased, and the brightness and yellowness tend to be strong in the following Lab color space image. Further, when a concentration of sulfuric acid is increased in the presence of sodium sulfate, $L^*$ tends to decrease and the brightness tends to decrease in the following Lab color space image, and both $a^*$ and $b^*$ tend to increase and the redness and yellowness tend to be strong.

In the Lab color space image used for the above color changes, a value of $L^*$ indicates the brightness, and the larger the numerical value, the brighter the Lab color space image. Tone is represented by $a^*$ and $b^*$, and when both $a^*$ and $b^*$ are 0, the color is achromatic. The more positive the $a^*$ is, the stronger the redness becomes, and the more negative the $a^*$ is, the stronger the greenness becomes. The more positive the $b^*$ is, the stronger the yellowness becomes, and the more negative the $b^*$ is, the stronger the blueness becomes.

On the other hand, when titanium dioxide having a brookite type crystal structure is preferentially synthesized, it is preferable that a hydrothermal reaction of titanium diboride is caused using nitric acid among acids, or a hydrothermal reaction of titanium diboride is caused in the presence of urea and sodium lactate. By changing the usage amount of urea used in the hydrothermal reaction in the presence of urea, the finally synthesized titanium dioxide coloring particles of the invention can develop various colors. When urea and sodium lactate are added, the crystal structure becomes a rutile type, and thus the color tends to be green.

Specifically, when the concentration of the acid increases, the developed color tends to be darker, and the redness and the yellowness tend to decrease. When an addition amount of sodium chloride (NaCl) in the HCl system increases, the brightness and the yellowness tend to increase. When sodium sulfate ($Na_2SO_4$) in the HCl system is added, the brightness decreases, a ratio of the anatase phase to the rutile phase increases, and the color tends to change to red. When the concentration of sulfuric acid increases, the developed color tends to change to a color with increased redness and yellowness.

In the invention, when an alkali is used as a precipitant, the color can be changed by changing the type and the usage amount of the alkali.

The hydrothermal reaction is usually performed in water (usually distilled water), and may also be performed in a mixed solvent of water and a water-soluble solvent. Examples of usable water-soluble solvents include an alcohol solvent, and specific examples of the alcohol solvent include methanol, ethanol, propanol, butanol, and the like.

A usage amount of the water-soluble solvent is not particularly limited, and may be 50 parts by mass to 1,000 parts by mass, and preferably 50 parts by mass to 100 parts by mass, with respect to 1 part by mass of titanium diboride. The usage amount of the water-soluble solvent is appropriately set.

As conditions for the hydrothermal reaction, conditions usually applied to the synthesis of titanium dioxide based on the hydrothermal reaction can be applied without a particular limitation. For example, a reaction temperature is usually set to 100° C. or higher, preferably 150° C. or higher, and more preferably 180° C. or higher. An upper limit temperature is usually set to be equal to or lower than a supercritical temperature of water of 374° C., and in the invention, the upper limit temperature is preferably 250° C. or lower, and more preferably 200° C. or lower. A reaction pressure is usually set to 1 atm to 250 atm, preferably 1 atm to 40 atm, and more preferably 1 atm to 12 atm. A reaction time is appropriately set according to the set reaction temperature and reaction pressure, and may be, for example, 1 hour to 48 hours, and preferably 6 hours to 30 hours. pH is not particularly limited, and is set to be acidic or basic depending on the acid, urea used or the like.

The hydrothermal reaction can be performed, for example, using a pressure-resistant reaction vessel such as an autoclave while performing stirring.

A reaction product obtained by the hydrothermal reaction is usually subjected to solid-liquid separation to obtain a solid content, and the solid content is washed and dried. Thus, the titanium dioxide particles having a brookite type or rutile type crystal structure and doped with boron can be synthesized without going through titanium dioxide having an anatase type crystal structure.

<Nitriding Treatment>

In the production method of the invention, the titanium dioxide particles doped with boron are subjected to a nitriding treatment. As methods and conditions for the nitriding treatment, methods and conditions that are normally applied to dope titanium dioxide with nitrogen can be applied without a particular limitation.

The nitriding treatment is not particularly limited, and examples thereof include a treatment of performing heating in an ammonia gas atmosphere as a nitrogen source, a treatment of mixing urea (usually powder) or carbon nitride ($C_3N_4$, usually powder) as a nitrogen source and performing heating, and the like. In the invention, the treatment of performing heating in an ammonia gas atmosphere is preferable, and heating is preferably performed in an ammonia gas stream. When performing the heating in the ammonia gas stream, a flow rate of the ammonia gas cannot be uniquely defined since it varies depending on a usage amount of the titanium dioxide particles subjected to the nitriding treatment, a capacity of a reaction vessel, and the like, and for example, the flow rate of the ammonia gas is preferably 50 mL/min to 1,000 mL/min, and more preferably 200 mL/min to 300 mL/min with respect to 1 g of the titanium dioxide particles.

A treatment temperature is not particularly limited, and is preferably 400° C. or higher, more preferably 500° C. to 900° C., and still more preferably 550° C. to 750° C. When the treatment temperature is set to 650° C. or higher, a temporary calcination treatment (introduction of a lattice defect) described later can be performed simultaneously with the nitriding treatment. However, in order to make the crystal structure of the obtained titanium dioxide coloring particles to be the brookite type, the treatment temperature is set to 650° C. or lower.

By changing the treatment temperature in the nitriding treatment, the finally synthesized titanium dioxide coloring particles of the invention can develop various colors. When the treatment temperature is increased, the doping amount of the nitrogen ions is increased, and the blueness of the developed color tends to increase. More specifically, in the above Lab color space image, L*, a*, and b* all tend to decrease, and a* may also tend to increase. In addition, by setting the treatment temperature to 650° C. or higher to transition the crystal structure from the brookite type to the rutile type, the color can be changed to a color specific to the rutile type crystal structure, a lattice defect can be formed, and the color development can be adjusted.

By changing the flow rate of the ammonia gas in the nitriding treatment, the finally synthesized titanium dioxide coloring particles of the invention can develop various colors. For example, when the flow rate of the ammonia gas is increased, the doping amount of the nitrogen ions tends to increase.

A treatment time is appropriately set according to the set treatment temperature and the like, and may be, for example, 0.5 hours to 5 hours, preferably 1 hour to 2 hours. By changing the treatment time in the nitriding treatment, the finally synthesized titanium dioxide coloring particles of the invention can develop various colors. For example, when the treatment time is prolonged, L*, a*, and b* all tend to decrease in the above Lab color space image.

When the nitriding treatment is performed, the titanium dioxide particles doped with boron can be pulverized and crushed.

The nitriding treatment may be performed using an appropriate reaction vessel.

By the above hydrothermal reaction and the nitriding treatment, the titanium dioxide coloring particles having a brookite type or rutile type crystal structure and co-doped with boron and nitrogen are synthesized.

The titanium dioxide coloring particles of the invention thus synthesized also develop colors other than the color developed by titanium dioxide having an anatase type crystal structure. The color exhibited by the titanium dioxide coloring particles of the invention varies as appropriate by changing synthesis conditions and the like as described above, and is a color corresponding to a band gap formed by both ions and the abundance of the lattice defect. For example, in the titanium dioxide coloring particles synthesized in Examples described later, those having a brookite type crystal structure develop a yellowish green color, whereas those having a rutile type crystal structure develop a bluish green color. As described above, a variety of exhibited colors can be achieved by changing the synthesis conditions, the doping amount, and the like, and further, the color depth and the like can also be adjusted.

<Temporary Calcination Treatment>

The present inventors have found that the color depth and the like can be adjusted by performing the temporary calcination treatment, as a method for introducing the lattice defect, in an inert gas or a vacuum before or after the nitriding treatment or simultaneously with the nitriding treatment under nitriding treatment conditions. That is, in a preferable production method of the invention, the lattice defect is formed by performing the temporary calcination treatment in an inert gas atmosphere or a vacuum atmosphere before or after the nitriding treatment. In this production method, the color developed by the above doping of both ions can be further adjusted.

The temporary calcination treatment can be performed at an appropriate timing after titanium dioxide is synthesized (a crystal structure is formed) by a hydrothermal reaction. The production method of the invention can be performed between the hydrothermal reaction and the nitriding treatment, after the nitriding treatment, or simultaneously with the nitriding treatment. When the temporary calcination treatment is performed between the hydrothermal reaction and the nitriding treatment or after the nitriding treatment, the crystal structure of the obtained titanium dioxide becomes a rutile type regardless of the crystal structure of the used titanium dioxide.

As methods and conditions of the temporary calcination treatment, methods and conditions usually applied to a treatment (temporary calcination treatment) for forming a lattice defect in titanium dioxide can be applied without a particular limitation.

Examples of the inert gas used in the temporary calcination treatment include a rare gas, a nitrogen gas, and the like, and the nitrogen gas is preferable. A vacuum state in which the temporary calcination treatment is performed is not particularly limited, and is usually set to 0.05 atm or less. The temporary calcination treatment may also be performed in an inert gas stream, and a flow rate in this case can be set to the same range as that of the flow rate in the above nitriding treatment.

A temporary calcination treatment temperature is not particularly limited, and is preferably 400° C. or higher, more preferably 500° C. to 1000° C., and still more preferably 550° C. to 750° C. However, in order to make the crystal structure of the obtained titanium dioxide coloring particles to be the brookite type, the treatment temperature is set to 650° C. or lower.

By changing the treatment temperature in the temporary calcination treatment, the abundance of the formed lattice defect or the doping amount of nitrogen can be adjusted, and various colors of the finally synthesized titanium dioxide coloring particles of the invention can be changed. For example, when the treatment temperature is increased, the abundance of the lattice defect is increased or the doping amount of nitrogen is decreased, and thus the brightness of the developed color is decreased, and the color tends to change to a dark color. In addition, when the treatment temperature is set to 650° C. or higher and the crystal structure is transitioned from the brookite type to the rutile type, the color can be changed to the color specific to the rutile type crystal structure.

Further, the treatment time of the temporary calcination treatment is appropriately set, and for example, may be set to 0.5 hours to 5 hours. By changing the treatment time, the color of the titanium dioxide coloring particles can be changed. For example, when the treatment time is prolonged, the brightness of the developed color decreases, and the color tends to change to a dark color.

Further, the color can also be changed by changing a timing at which the temporary calcination treatment is performed. When the temporary calcination treatment is performed before or after the nitriding treatment, L* and b* are both reduced in the above Lab color space image, and the brightness, the redness, and the yellowness tend to decrease. In particular, when the temporary calcination treatment is performed after the nitriding treatment, decrease amounts of L* and b* in the Lab color space image are increased, and decrease amounts of the brightness and the yellowness tend to increase. More specifically, when the temporary calcination treatment is performed between the hydrothermal reaction and the nitriding treatment, with respect to the titanium dioxide coloring particles co-doped with both boron ions and nitrogen ions, titanium dioxide coloring particles having a brookite type crystal structure change to a dark color, and titanium dioxide coloring particles having a rutile type crystal structure changes to a dark color, but a change degree thereof is smaller and the color tends to be lighter as compared with the brookite type and the like. In addition, when the temporary calcination treatment is performed after the nitriding treatment, both the titanium dioxide coloring particles having a brookite type crystal structure and the titanium dioxide coloring particles having a rutile type crystal structure tend to change to a dark color with respect to the titanium dioxide coloring particles co-doped with both boron ions and nitrogen ions. When the temporary calcination treatment is performed simultaneously with the nitriding treatment, the doping amount of nitrogen can be increased.

<Pulverization Treatment>

The titanium dioxide particles obtained by the above nitriding treatment and the titanium dioxide particles obtained by the above temporary calcination treatment may be pulverized or crushed by a usual method to adjust the particle diameter.

In the production method of the invention, the hydrothermal reaction is adopted for the synthesis of titanium dioxide (construction of the crystal structure), then the nitriding treatment is performed, and further the temporary calcination treatment is preferably performed. Therefore, titanium dioxide coloring particles exhibiting various colors can be produced by a simple process while reducing the environmental load.

EXAMPLES

Hereinafter, the invention will be described in more detail based on Examples, and the invention is not limited by these descriptions.

Reference Example 1-1

With reference to NPL 2, titanium dioxide coloring particles having an anatase type crystal structure and co-doped with both nitrogen ions and boron ions were produced.

Specifically, 2 mL (40 mmol) of sulfuric acid (manufactured by Kanto Chemical Co., Inc., purity >96.0%) and 5.6816 g (40 mmol) of sodium sulfate (manufactured by Kanto Chemical Co., Inc., purity >99.0%) were mixed with distilled water to prepare a precursor solution so as to have a total amount of 80 mL. Then, 1.1118 g (16 mmol) of titanium diboride powder (manufactured by Sigma-Aldrich Corporation, particle diameter <10 μm) was added to the prepared precursor solution, and stirring and mixing were performed with a magnetic stirrer until the titanium diboride powder was uniformly distributed. The obtained mixed solution was sealed in a Teflon (registered trademark)-lined autoclave, and a hydrothermal reaction was performed at 180° C. (saturated water vapor pressure, about 10 atm) for 24 hours using a rotary electric furnace. A solid product was separated from a suspension after the reaction by filtration under reduced pressure, washed several times with distilled water, and then dried in the air at 80° C. Thus, 1.0 g of $TiO_2$ having an anatase type crystal structure and doped with boron ions was obtained as a gray powder.

Next, 1.0 g of the obtained gray powder was pulverized in a mortar, and subjected to a nitriding treatment at 600° C. for 1 hour in an ammonia gas stream of 50 mL/min.

Thus, 1.0 g of particles (average primary particle diameter <0.6 μm, average secondary particle diameter: about 5 μm) of $TiO_2$ (B/N—$TiO_2$ (anatase)) doped with both boron ions and nitrogen irons were produced. The crystal structure of $TiO_2$ was the anatase type, and the obtained $TiO_2$ was visually red.

Example 1-1

Titanium dioxide coloring particles having a rutile type crystal structure and co-doped with both nitrogen ions and boron ions were produced as follows.

Specifically, 3 mL of 6M hydrochloric acid (Kanto Chemical Co., Inc.) was diluted with 200 mL of distilled water to prepare a 0.5 mol/L aqueous hydrochloric acid solution. The prepared aqueous hydrochloric acid solution (0.2 mol as HCl) and 1.1118 g (16 mmol) of titanium diboride were thoroughly mixed to prepare a mixed solution (total amount: 80 mL). Using this mixed solution, a hydrothermal reaction and a nitriding treatment were performed in the same manner (under the same reaction conditions) as in the above Reference Example 1-1.

Thus, 0.9 g of particles (rod-shaped particles each having a width of 0.05 μm to 0.1 μm and a length of 0.2 μm to 0.5 μm, average secondary particle diameter: 5 μm) of $TiO_2$ (B/N—$TiO_2$ (rutile)) doped with both boron ions and nitrogen irons were produced. The crystal structure of $TiO_2$ was the rutile type, and the obtained $TiO_2$ was visually (bluish) green.

Example 1-2

Titanium dioxide coloring particles having a brookite type crystal structure and co-doped with both nitrogen ions and boron ions were produced as follows.

Specifically, 9.6096 g (160 mmol) of urea (concentration: 99.0 mass %, Wako Pure Chemical Industries, Ltd.) was dissolved in about 75 mL of distilled water to prepare a urea aqueous solution. Further, 3 mL of a DL-sodium lactate solution (concentration: 60 mass %, manufactured by SIGMA) and 1.1118 g (16 mmol) of titanium diboride were added, followed by stirring and mixing, and a precursor solution (total amount: 80 mL) was prepared. The obtained precursor solution was subjected to a hydrothermal reaction at 180° C. for 8 hours in the same manner as in the above Reference Example 1-1.

Next, 0.8 g of the obtained powder was used to perform a nitriding treatment in the same manner (the same reaction conditions) as in Reference Example 1-1.

Thus, 0.8 g of particles (average primary particle diameter: 0.01 μm and average secondary particle diameter: 5 μm)) of $TiO_2$ (B/N—$TiO_2$ (brookite)) doped with both boron ions and nitrogen irons were produced. The crystal structure of $TiO_2$ was the brookite type, but an anatase type and a rutile type were mixed in an amount less than the above abundance (very small amount). The obtained B/N—$TiO_2$ (brookite) was visually (yellowish) green.

<Measurement of Diffuse Reflection Spectrum>

Diffuse reflection spectra (DSR) of the produced titanium dioxide coloring particles (B/N—$TiO_2$) were measured by the following method and conditions. Results are shown in FIG. 1. In FIG. 1, "B/N-Anatase" represents B/N—$TiO_2$ (anatase) produced in Reference Example 1-1, "B/N-Rutile" represents B/N—$TiO_2$ (rutile) produced in Example 1-1, and "B/N-Brookite" represents B/N—$TiO_2$ (brookite) produced in Example 1-2. In FIG. 1, a horizontal axis represents wavelength (nm), and a vertical axis represents absorbance (a.u.).

Referring to FIG. 1, it can be seen that in a wavelength region of visible light, each B/N—$TiO_2$ indicates specific wavelength absorption, and results of visually checking color development are supported.

—Measurement Method and Measurement Conditions of Diffuse Reflection Spectrum—

A powder sample of each of the produced titanium dioxide coloring particles was placed in a diffuse reflection unit, and a diffuse reflectance was measured in a wavelength region of 200 nm to 2,000 nm to obtain a light absorption spectrum.

<Calculation of Band Gap>

A band gap of each of the titanium dioxide coloring particles (B/N—$TiO_2$) was calculated (converted) in the following manner according to a Tauc Plot method based on the above diffuse reflection spectrum.

—Method for Calculating Band Gap—

The band gap was calculated based on the following relational expression proposed by Tauc et al.

$$(h\nu\alpha)^{1/n}=k(h\nu-Eg) \qquad \text{Relational Expression:}$$

Here, h is a Planck constant, $\nu$ is a frequency, $\alpha$ is an absorption coefficient, k is a proportionality constant, and Eg is a band gap. n is a value peculiar to a type of semiconductor transition, and in the case of titanium dioxide, which is a direct transition semiconductor, n=1/2.

The Tauc Plot used for calculating the band gap from the diffuse reflection spectrum is shown in FIG. 2. In FIG. 2, "B/N-Anatase" represents B/N—$TiO_2$ (anatase) produced in Reference Example 1-1, "B/N-Rutile" represents B/N—$TiO_2$ (rutile) produced in Example 1-1, and "B/N-Brookite" represents B/N—$TiO_2$ (brookite) produced in Example 1-2.

The calculated band gaps were 1.81 eV for B/N—$TiO_2$ (anatase), 2.89 eV for B/N—$TiO_2$ (rutile), and 2.23 eV for B/N—$TiO_2$ (brookite).

In addition, as shown in FIG. 2, the band gap of B/N—$TiO_2$ (anatase) was reduced by about 1.39 eV as compared with a band gap of 3.2 eV of unco-doped $TiO_2$ (anatase), and a smallest band gap was shown.

<Measurement of Doping Amount>

The abundance of the ions (doping amount), the doping amount of the ions doped between the lattices, and the doping amount of the ions doped by substituting oxygen ions of the produced titanium dioxide coloring particles (B/N—$TiO_2$) were measured or calculated by the following method. Results are shown in Table 1.

Measurement method and conditions: The doping amount of the ions was determined by an X-ray photoelectron spectroscopy (XPS) based on a ratio of a peak area corresponding to an N1s orbital and a B1s orbital.

TABLE 1

| | | | Content (atom %) | | | | |
| | | | Nitrogen | | Boron | | |
| B/N—TiO$_2$ | Titanium | Oxygen | Interstitial type | Substituted type | Interstitial type | Substituted type | Boron Ratio* |
|---|---|---|---|---|---|---|---|
| Brookite | 30.70 | 64.80 | 0.26 | 1.30 | 2.35 | 0.61 | 3.85 |
| Rutile | 29.03 | 64.77 | 0.16 | 2.47 | 2.64 | 0.92 | 2.87 |

Ratio*: [doping amount of interstitial type B/doping amount of substituted type B]

B/N—TiO$_2$ (rutile) contained nitrogen and boron in the doping amount shown in Table 1, and had a band gap of 2.89 eV obtained by reducing a band gap of 3.06 eV specific to unco-doped TiO$_2$ (rutile). As a result, it is considered that the above specific color was developed. In addition, B/N—TiO$_2$ (brookite) was co-doped with boron and nitrogen in doping amounts of the ions shown in Table 1, and had a band gap reduced to 2.23 eV. As a result, it is considered that the above specific color was developed.

L*, a*, and b* (CIELAB system) in the Lab color space image were 31.0, 15.4 and 12.2 for B/N—TiO$_2$ (anatase) in order, 51.0, −4.8 and 8.0 for B/N—TiO$_2$ (rutile) in order, and 54.4, −3.4, and 10.9 for B/N—TiO$_2$ (brookite) in order.

Example 2-1

B/N—TiO$_{(2-x)}$ (rutile) was produced by performing a hydrothermal reaction, a temporary calcination treatment, and a nitriding treatment in this order as follows.

Specifically, a hydrothermal reaction was performed in the same manner as in Example 1-1 to obtain boron-doped titanium dioxide (B—TiO$_2$ (rutile)). Lattice defects (oxygen defect and Ti$^{3+}$) were introduced before B—TiO$_2$ was subjected to the temporary calcination treatment at 800° C. for 1 hour in an atmosphere of N$_2$ gas (pure nitrogen G1, purity: 99.99995%) and subjected to the nitriding treatment. The obtained titanium dioxide was subjected to the nitriding treatment in the same manner as in Example 1-1.

Thus, particles (rod-shaped particles having an average primary particle diameter of 0.05 μm to 0.1 μm and a length of 0.2 μm to 0.5 μm, average secondary particle diameter: 5 μm) of B/N—TiO$_{(2-x)}$ (rutile) were produced. Regarding the titanium dioxide coloring particles, x was 0.10.

x was quantified, using thermogravimetric analysis (TG-DTA), by mass increase when TiO$_{(2-x)}$ was oxidized into TiO$_2$ with performing heating in the air. It was checked by electron paramagnetic resonance (EPR) analysis that the defects introduced into the obtained titanium dioxide were the oxygen defect and Ti$^{3+}$. The same applies to the following Examples.

Example 2-2

(B/N—TiO$_{(2-x)}$ (rutile)) was produced by performing a hydrothermal reaction, a temporary calcination treatment, and a nitriding treatment in this order as follows.

Specifically, a hydrothermal reaction was performed in the same manner as in Example 1-2 to obtain boron-doped titanium dioxide (B—TiO$_2$ (brookite)). Then, this B—TiO$_2$ was subjected to a temporary calcination treatment in the same manner as in Example 2-1, and then subjected to a nitriding treatment in the same manner as in Example 1-1.

Thus, particles (fine particles having an average primary particle diameter (width) of 0.02 μm, average secondary particle diameter: 3 μm) of B/N—TiO$_{(2-x)}$ (rutile) were produced. Regarding the titanium dioxide coloring particles, x>0.20.

For B/N—TiO$_{(2-x)}$ (rutile) obtained in Examples 2-1 and 2-2, L*, a*, and b* (CIELAB system) in the Lab color space image are shown in Table 2.

<Measurement of Diffuse Reflection Spectrum>

A diffuse reflection spectrum of the produced titanium dioxide was measured in the same manner as in Example 1-1. Results are shown in FIG. 3. In FIG. 3, a horizontal axis represents wavelength (nm), and a vertical axis represents absorbance (a.u.). In the diagram indicated by "B/N-Rutile" in FIG. 3, "600° C., NH$_3$" represents a result of B/N—TiO$_2$ (rutile) (Example 1-1) obtained by performing the nitriding treatment at 600° C. in the ammonia gas stream, and "800° C., N$_2$+600° C., NH$_3$" represents B/N—TiO$_{(2-x)}$ (rutile) produced in Example 2-1. In addition, in the diagram indicated by "B/N-Brookite" in FIG. 3, "600° C., NH$_3$" represents a result of B/N—TiO$_2$ (brookite) (Example 1-2) obtained by performing the nitriding treatment at 600° C. in the ammonia gas stream, and "800° C., N$_2$+600° C., NH$_3$" represents B/N—TiO$_{(2-x)}$ (rutile) produced in Example 2-2.

B/N—TiO$_{(2-x)}$ (rutile) produced in Example 2-2 had a darker color visually compared with B/N—TiO$_2$ (brookite) obtained by performing the nitriding treatment at 600° C. in the ammonia gas stream, and this is supported by a larger amount of absorption in a visible light region (wavelength 350 to 750 nm) as shown in FIG. 3. On the other hand, B/N-TiO$_{(2-x)}$ (rutile) produced in Example 2-1 had a slightly lighter color visually than B/N—TiO$_2$ (rutile) obtained by performing the nitriding treatment at 600° C. in the ammonia gas stream, and this is supported by a less amount of absorption of visible light as shown in FIG. 3.

Example 3-1

B/N—TiO$_{(2-x)}$ (rutile) was produced by performing a temporary calcination treatment simultaneously with a nitriding treatment after a hydrothermal reaction as follows.

Specifically, particles (average primary particle diameter: 0.02 μm, average secondary particle diameter: 3 μm) of B/N—TiO$_{(2-x)}$ (rutile) were produced in the same manner as in Example 1-1 except that a temperature of the nitriding treatment performed in an ammonia gas (purity: 99.999%) stream in Example 1-1 was changed from 600° C. to 650° C. or 700° C., and a lattice defect was formed along with doping of nitrogen (nitriding treatment and temporary calcination treatment were performed). Regarding the titanium dioxide coloring particles, x>0.10.

Example 3-2

(B/N—TiO$_{(2-x)}$ (brookite)) was produced by performing a temporary calcination treatment simultaneously with a nitriding treatment after a hydrothermal reaction as follows.

Specifically, particles (average primary particle diameter: 0.02 μm, average secondary particle diameter: about 3 μm) of B/N—TiO$_{(2-x)}$ (brookite) were produced in the same manner as in Example 1-2 except that a temperature of the nitriding treatment performed in an ammonia gas stream in Example 1-2 was changed from 600° C. to 650° C. or 700° C., and a lattice defect was formed along with doping of nitrogen (nitriding treatment and temporary calcination treatment were performed). Regarding the titanium dioxide coloring particles, x>0.2.

<Measurement of Diffuse Reflection Spectrum>

A diffuse reflection spectrum of the produced titanium dioxide was measured in the same manner as in Example 1-1. Results are shown in FIG. 4. In FIG. 4, a horizontal axis represents wavelength (nm), and a vertical axis represents absorbance (a.u.). In the diagram indicated by "B/N-Rutile" in FIG. 4, "600° C., NH$_3$" represents a result of B/N—TiO$_2$ (rutile) (Example 1-1) obtained by performing the nitriding treatment at 600° C. in the ammonia gas stream, "650° C., NH$_3$" represents a result of B/N—TiO$_{(2-x)}$ (rutile) of Example 3-1 obtained by performing the nitriding treatment and the temporary calcination treatment at 650° C. in the ammonia gas stream, and "700° C., NH$_3$" represents a result of B/N—TiO$_{(2-x)}$ (rutile) of Example 3-1 obtained by performing the nitriding treatment and the temporary calcination treatment at 700° C. in the ammonia gas stream. In addition, in the diagram indicated by "B/N-Brookite" in FIG. 4, "600° C., NH$_3$" represents a result of B/N—TiO$_2$ (brookite) (Example 1-2) obtained by performing the nitriding treatment at 600° C. in the ammonia gas stream, "650° C., NH$_3$" represents a result of B/N—TiO$_{(2-x)}$ (brookite) of Example 3-2 obtained by performing the nitriding treatment and the temporary calcination treatment at 650° C. in the ammonia gas stream, and "700° C., NH$_3$" represents a result of B/N—TiO$_{(2-x)}$ (brookite) of Example 3-2 obtained by performing the nitriding treatment and the temporary calcination treatment at 700° C. in the ammonia gas stream.

For B/N—TiO$_{(2-x)}$ (rutile) and B/N—TiO$_{(2-x)}$ (brookite) respectively obtained in Examples 3-1 and 3-2, L*, a*, and b* (CIELAB system) in the Lab color space image are shown in Table 2.

In both of B/N—TiO$_{(2-x)}$ (rutile) obtained in Example 3-1 and B/N—TiO$_{(2-x)}$ (brookite) obtained in Example 3-2, the higher the temperature of the nitriding treatment was, the lower the brightness of the color that can be visually checked was. Specifically, B/N—TiO$_{(2-x)}$ for which the temperature of the nitriding treatment was set to 650° C. was visually observed to maintain color saturation, but had decreased brightness as compared with B/N—TiO$_2$ (brookite) and B/N—TiO$_2$ (rutile) obtained by performing the nitriding treatment at 600° C. in the ammonia gas stream. Further, B/N-TiO$_{(2-x)}$ for which the temperature of the nitriding treatment was set to 700° C. was darker as it was difficult to determine the color with the naked eye. This is also supported by the fact that the higher the temperature of the nitriding treatment and the temporary calcination treatment was, the larger the abundance of the lattice defect was, and as shown in FIG. 4, the larger the absorption amount in the visible light region was.

Example 4-1

B/N—TiO$_{(2-x)}$ (rutile) was produced by performing a hydrothermal reaction, a nitriding treatment, and a temporary calcination treatment in this order as follows.

Specifically, TiO$_2$ (B/N—TiO$_2$ (rutile)) obtained by the hydrothermal reaction and the nitriding treatment in Example 1-1 was subjected to the temporary calcination treatment for 1 hour in an atmosphere of N$_2$ gas (pure nitrogen G1, purity: 99.99995%) by setting a temporary calcination treatment temperature to 800° C. or 900° C.

Thus, particles (average primary particle diameter: 0.05 μm to 0.1 μm, average secondary particle diameter: 3 μm) of B/N—TiO$_{(2-x)}$ (rutile) were produced. Regarding the titanium dioxide coloring particles, x>0.2.

Example 4-2

B/N TiO$_{(2-x)}$ (rutile) was produced by performing a hydrothermal reaction, a nitriding treatment, and a temporary calcination treatment in this order as follows.

Specifically, TiO$_2$ (B/N—TiO$_2$ (brookite)) obtained by the hydrothermal reaction and the nitriding treatment in Example 1-1 was subjected to the temporary calcination treatment in the same manner as in Example 4-1 to produce particles (average primary particle diameter: 0.05 μm to 0.1 μm, average secondary particle diameter: 0.4 μm) of B/N—TiO$_{(2-x)}$ (rutile). Regarding the titanium dioxide coloring particles, x>0.20.

<Measurement of Diffuse Reflection Spectrum>

A diffuse reflection spectrum of the produced titanium dioxide was measured in the same manner as in Example 1-1. Results are shown in FIG. 5. In FIG. 5, a horizontal axis represents wavelength (nm), and a vertical axis represents absorbance (a.u.). In the diagram indicated by "B/N-Rutile" in FIG. 5, "600° C., NH$_3$" represents a result of B/N—TiO$_2$ (rutile) (Example 1-1) obtained by performing the nitriding treatment at 600° C. in the ammonia gas stream, "600° C., NH$_3$+800° C., N2" represents a result of B/N—TiO$_{(2-x)}$ (rutile) of Example 4-1 obtained by performing the nitriding treatment at 600° C. in the ammonia gas stream and then performing the nitriding treatment at 800° C., and "600° C., NH$_3$+900° C., N$_2$" represents a result of B/N—TiO$_{(2-x)}$ (rutile) of Example 4-1 obtained by performing the nitriding treatment at 600° C. in the ammonia gas stream and then performing the nitriding treatment at 900° C. In addition, in the diagram indicated by "B/N-Brookite" in FIG. 5, "600° C., NH$_3$" represents a result of B/N—TiO$_2$ (brookite) (Example 1-2) obtained by performing the nitriding treatment at 600° C. in the ammonia gas stream, "650° C., NH$_3$+800° C., N2" represents a result of B/N—TiO$_{(2-x)}$ (rutile) of Example 4-2 obtained by performing the nitriding treatment at 800° C. in the ammonia gas stream, and "600° C., NH$_3$+900° C., N$_2$" represents a result of B/N—TiO$_{(2-x)}$ (rutile) of Example 4-2 obtained by performing the nitriding treatment at 600° C. in the ammonia gas stream and then performing the nitriding treatment at 900° C.

For B/N—TiO$_{(2-x)}$ (rutile) and B/N—TiO$_{(2-x)}$ (brookite) respectively obtained in Examples 4-1 and 4-2, L*, a*, and b* (CIELAB system) in the Lab color space image are shown in Table 2.

In both of B/N—TiO$_{(2-x)}$ (rutile) obtained in Example 4-1 and B/N—TiO$_{(2-x)}$ (rutile) obtained in Example 4-2, blackness was visually increased, and when the temporary calcination treatment temperature was increased, the color further became darker and was substantially black. This is also supported by a fact that the higher the temporary calcination treatment temperature is, the larger the amount of the doped nitrogen is, and as shown in FIG. 5, an intensity of a characteristic peak representing a presence of a nitrogen dopant in a wavelength region of 400 nm to 500 nm is weakened and the particles were almost burned out at a calcining temperature of 900° C. In addition, it can be seen that a rise in a long wavelength region derived from $Ti^{3+}$ becomes strong, and the abundance of the lattice defect ($Ti^{3+}$) increases.

TABLE 2

| | Treatment temperature | L* | a* | b* |
|---|---|---|---|---|
| Example 2-1 | | 48.4 | −3.7 | 3.5 |
| Example 2-2 | | 49.4 | −1.3 | 3.8 |
| Example 3-1 | 600° C. | 51.0 | −4.8 | 8.0 |
| | (Example 1-1) | | | |
| | 650° C. | 33.7 | −3.9 | 0.1 |
| | 700° C. | 26.2 | −3.2 | −3.5 |
| Example 3-2 | 600° C. | 54.4 | −3.4 | 10.9 |
| | (Example 1-2) | | | |
| | 650° C. | 46.4 | −3.4 | 6.6 |
| | 700° C. | 39.8 | −2.8 | 0.8 |
| Example 4-1 | 800° C. | 46.9 | −3.3 | −5.3 |
| | 900° C. | 38.7 | −3.4 | −6.9 |
| Example 4-2 | 800° C. | 32.2 | −2.9 | −6.3 |
| | 900° C. | 28.5 | −2.4 | −6.0 |

As is clear from the results of the above Examples and Reference Examples, the titanium dioxide coloring particles of the invention having a brookite type or rutile type crystal structure of titanium dioxide and further co-doped with both nitrogen ions and boron ions can develop various colors other than a color developed by titanium dioxide having an anatase type crystal structure. Moreover, by forming a lattice defect in the titanium dioxide coloring particles, a color depth and the like can be further adjusted, and various colors can be developed. In addition, by changing production conditions such as the nitriding treatment temperature and the temporary calcination treatment temperature, the color developed by the titanium dioxide coloring particles can be adjusted (controlled). Further, a titanium dioxide particle mixture prepared by using the titanium dioxide coloring particles developing various colors further develops a wide variety of colors depending on, for example, a combination and a blending amount of mixed titanium dioxide particles. The titanium dioxide coloring particles that develop various colors and the titanium dioxide particle mixture of the invention can be used as various pigments of paints and cosmetics and the like, photocatalysts, and can also be used as medical applications, food additives, etc., taking advantage of non-toxicity thereof.

In addition, in a method for producing the titanium dioxide coloring particles of the invention, the titanium dioxide coloring particles that develop various colors can be produced by two processes that are a hydrothermal reaction and a nitriding treatment with a small environmental load, and are simpler than a sol-gel method. Moreover, different colors can be developed by changing production conditions of the two processes, a timing at which a temporary calcination treatment is performed, and the like.

The invention has been described with reference to the embodiment thereof, and it is considered by the inventors that the invention is not intended to be limited in any detail of the description unless otherwise specified, and should be interpreted broadly without departing from the spirit and scope of the invention shown in the appended claims.

The present application claims priority based on Japanese Patent Application No. 2020-130912 filed in Japan on Jul. 31, 2020, and contents of which are incorporated herein by reference as a part of the present description.

The invention claimed is:

1. Titanium dioxide coloring particles that have a brookite type or rutile type crystal structure and are co-doped with at least nitrogen and boron,
    wherein the titanium dioxide coloring particles have a lattice defect, and
    the titanium dioxide coloring particles having a lattice defect are represented by a formula: $TiO_{(2-x)}$ in which x is 0.01 to 1.

2. A titanium dioxide particle mixture comprising at least one type of the titanium dioxide coloring particles according to claim 1.

3. A method for producing titanium dioxide coloring particles, the method comprising:
    causing a hydrothermal reaction of titanium diboride in presence of an acid or urea, and then performing a nitriding treatment in an ammonia gas atmosphere or by mixing with urea or carbon nitride,
    wherein the titanium dioxide coloring particles have a brookite type or rutile type crystal structure and are co-doped with at least nitrogen and boron,
    the titanium dioxide coloring particles have a lattice defect, and
    the titanium dioxide coloring particles having a lattice defect are represented by a formula: $TiO_{(2-x)}$ in which x is 0.01 to 1.

4. The method for producing titanium dioxide coloring particles according to claim 3,
    wherein a temporary calcination treatment is performed in an inert gas or a vacuum between the hydrothermal reaction and the nitriding treatment or after the nitriding treatment.

5. The method for producing titanium dioxide coloring particles according to claim 3,
    wherein a temporary calcination treatment is performed simultaneously with the nitriding treatment.

* * * * *